United States Patent
Dimitrakos et al.

(10) Patent No.: US 10,038,557 B2
(45) Date of Patent: Jul. 31, 2018

(54) SECURE OBJECT ACCESS

(71) Applicant: British Telecommunications Public Limited Company, London (GB)

(72) Inventors: Theo Dimitrakos, London (GB); Ali Sajjad, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/509,090

(22) PCT Filed: Sep. 24, 2015

(86) PCT No.: PCT/EP2015/072000
§ 371 (c)(1),
(2) Date: Mar. 6, 2017

(87) PCT Pub. No.: WO2016/046324
PCT Pub. Date: Mar. 31, 2016

(65) Prior Publication Data
US 2017/0288871 A1    Oct. 5, 2017

(30) Foreign Application Priority Data
Sep. 26, 2014 (EP) ................................ 14250106

(51) Int. Cl.
*H04L 9/32*       (2006.01)
*G06F 21/60*     (2013.01)
(Continued)

(52) U.S. Cl.
CPC ............. *H04L 9/321* (2013.01); *G06F 21/31* (2013.01); *G06F 21/602* (2013.01);
(Continued)

(58) Field of Classification Search
CPC ...... H04L 9/321; H04L 2209/24; G06F 21/31; G06F 21/602
See application file for complete search history.

(56) References Cited

U.S. PATENT DOCUMENTS

2005/0235143 A1* 10/2005 Kelly ................... G06F 21/10
                                                                   713/165
2008/0263372 A1* 10/2008 Sako .................... G06F 21/10
                                                                   713/193
(Continued)

FOREIGN PATENT DOCUMENTS

EP          2645618 A1    10/2013

OTHER PUBLICATIONS

International Search Report for corresponding International Application No. PCT/EP2015/072000 dated Nov. 4, 2015; 3 pages.
(Continued)

*Primary Examiner* — Wasika Nipa
(74) *Attorney, Agent, or Firm* — Amy M. Salmela; Patterson Thuente Pedersen, P.A.

(57) ABSTRACT

A method of a security system to provide access by a requester to an encrypted data object stored in an object store, the requester being authenticated by the object store, the method comprising: receiving, from the object store: the encrypted object having associated an object identifier; and an identifier of the requester; deriving a first cryptographic key to decrypt the object; deriving a second cryptographic key; re-encrypting the object based on the second key and communicating the re-encrypted object to the requester; wherein each of the first and second keys are based on the object identifier, the requester identifier and a secret key portion generated by the security system, the secret key portion being different for each of the first and second keys, the method further comprising: in response to a second
(Continued)

authentication of the requester by the security system, communicating the secret key portion for the second key to the requester.

7 Claims, 5 Drawing Sheets

(51) Int. Cl.
    *H04L 9/08*       (2006.01)
    *G06F 21/31*     (2013.01)
    *G06F 21/62*     (2013.01)

(52) U.S. Cl.
    CPC ........ *G06F 21/6209* (2013.01); *H04L 9/0866* (2013.01); *H04L 2209/24* (2013.01)

(56) References Cited

U.S. PATENT DOCUMENTS

| | | |
|---|---|---|
| 2013/0243197 A1 | 9/2013 | Sherwood et al. |
| 2017/0288863 A1 | 10/2017 | Dimitrakos et al. |

OTHER PUBLICATIONS

Written Opinion of the International Searching Authority for corresponding International Application No. PCT/EP2015/072000 dated Nov. 4, 2015; 7 pages.
Application and Filing Receipt for U.S. Appl. No. 15/507,840, filed Mar. 1, 2017, Inventor(s): Dimitrakos et al.

* cited by examiner

SECURE OBJECT ACCESS

CROSS-REFERENCE TO RELATED APPLICATIONS

The present application is a National Phase entry of PCT Application No. PCT/EP2015/072000, filed on 24 Sep. 2015, which claims priority to EP Patent Application No. 14250106.3, filed on 26 Sep. 2014, which are hereby fully incorporated herein by reference.

TECHNICAL FIELD

The present disclosure relates to secure data object access. In particular it relates to a security system for providing access to an encrypted data object.

BACKGROUND

Data stored in data stores such a file systems and object stores can be secured by employing access control, authentication or encryption technologies. Such technologies are susceptible to being compromised through attack, negligence or ineffective configuration.

For example, one technique for securing files stored in a file system is the Encrypting File System (EFS) provided by Microsoft. EFS provides for the encryption of files stored in a file system with access control managed by an EFS driver installed as part of, or as an extension to, an operating system. Files are encrypted using a symmetric key which is itself encrypted using an asymmetric key pair. A symmetric key is encrypted in this way because volumes of data can be encrypted more quickly using a symmetric key than using an asymmetric key.

The symmetric key is encrypted using a public key associated with a user for which file access is permitted, the user being authenticated based on normal Windows operating system user credentials. Subsequently, the file may be decrypted for an authenticated user by the EFS using the corresponding private key for the user to decrypt the symmetric key which is used to decrypt the file. Alternatively, the symmetric key may be decrypted for an authenticated special (super) user having administrator rights, whereby the EFS decrypts the file based on the symmetric key.

While this approach is effective for providing secure data storage for which access is controlled on a user basis, the approach of EFS and similar technologies suffers considerable disadvantages. In particular, the reliance on a single set of operating system credentials to provide access to encrypted data introduces a considerable weakness in the security mechanism. Essentially the only protection against complete encrypted data access is the user credential such as a user ID (not normally secret) and a password. Passwords can be stolen, intercepted, lost, discovered and are susceptible to brute-force attack. Further, the ability of a special (super) user, such as an administrator, to always decrypt user files introduces a further vulnerability in that two sets of credentials are available for attack or discovery in order to access secure data: user credentials; and administrator credentials. Indeed, compromised administrator credentials will potentially expose all secure data stored in a file system. Further, losing or forgetting passwords for a user and administrator can render secured data inaccessible.

It would therefore be advantageous to address these disadvantages with known secure data storage techniques.

SUMMARY

The present disclosure accordingly provides, in a first aspect, a method of a security system to provide access by a requester to an encrypted data object stored in an object store, the requester being authenticated by the object store, the method comprising: receiving, from the object store: the encrypted object having associated an object identifier; and an identifier of the requester; deriving a first cryptographic key to decrypt the object; deriving a second cryptographic key; re-encrypting the object based on the second key and communicating the re-encrypted object to the requester; wherein each of the first and second keys are based on the object identifier, the requester identifier and a secret key portion generated by the security system, the secret key portion being different for each of the first and second keys, the method further comprising: in response to a second authentication of the requester by the security system, communicating the secret key portion for the second key to the requester.

In one embodiment the authentication by the object store and the second authentication are undertaken using different authentication techniques.

In one embodiment the encrypted object is encrypted by the security system using the first cryptographic key and stored in the object store.

In one embodiment access to the secret key portion for the first cryptographic key is restricted to the security system.

In one embodiment the first and second cryptographic keys are symmetric cryptographic keys.

Thus embodiments of the present disclosure provide for a multiple authentication requirements for access to stored encrypted data objects in the object store. Each authentication can take place using a different approach to authentication which can include different authentication factors (multi-factor authentication), different credentials and the like. Further, each authentication takes place with a different system—a first authentication taking place with the object store and a second authentication taking place with the security system.

Additionally, embodiments of the present disclosure utilize multiple cryptographic keys, a first cryptographic key for the storage of a data object and a second cryptographic key for each retrieval of the object. Thus, when stored, only the security system can derive the cryptographic key necessary for access to the object. Even the requester itself does not possess the information required to access the encrypted object. Thus, compromise of any of the object store, the requester or the interfaces therebetween will not provide access to the encrypted data object.

Further, data objects are encrypted and stored on a per-user basis such that individual users access encrypted objects based on their requester identifier. Similarly, encryption of data takes place on a data object basis such that individual objects are encrypted based on their object identifier.

Additionally, the second cryptographic key (which is communicated outside the security system) is suitable only to decrypt the re-encrypted data object. The second cryptographic key cannot decrypt the encrypted data object stored in the object store.

The present disclosure accordingly provides, in a second aspect, a security system to provide access by a requester to an encrypted data object stored in an object store, the requester being authenticated by the object store, the system comprising: a first interface to communicate with the object store via which is received: the encrypted object having associated an object identifier; and an identifier of the requester; a key derivation system to generate first and second cryptographic keys, the first key being used by the security system to decrypt the object; an encrypter to re-encrypting the object based on the second key; a second interface to communicate with the requester; wherein each of the first and second keys are based on the object identifier, the requester identifier and a secret key portion generated by the security system, the secret key portion being different for each of the first and second keys, and wherein the re-encrypted object is provided to the object store via the first interface for access by the requester, the system further comprising: an access control system including a challenge generator to further authenticate the requester based on a response to the challenge received via the second interface, wherein the second interface is further responsive to the access control system to communicate the secret key portion for the second key to the requester.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION

Figure 1:
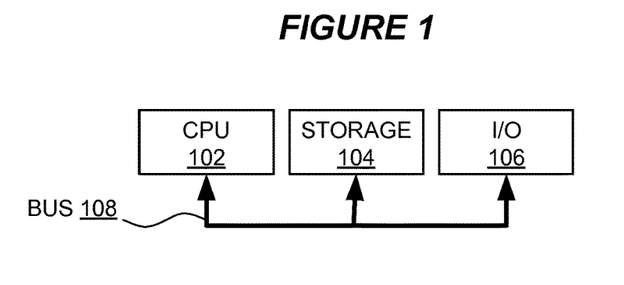
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
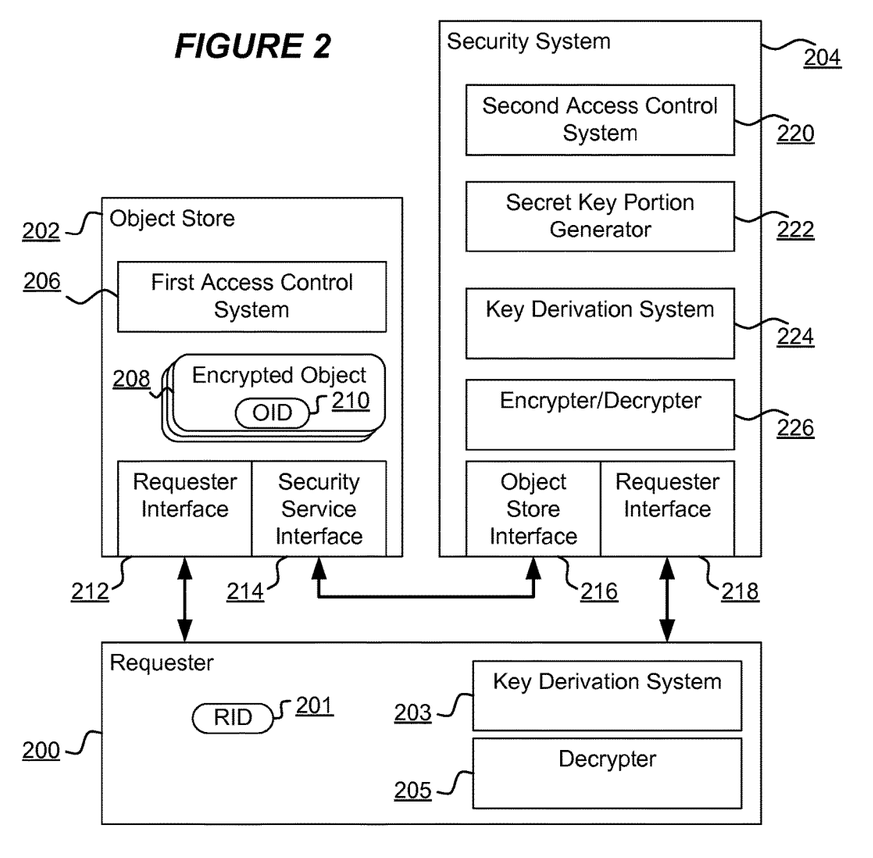
FIG. 2 is a component diagram of an exemplary arrangement of a security system for providing access by a requester to an encrypted data object stored in an object store in accordance with embodiments of the present disclosure.

FIG. 2 is a component diagram of an exemplary arrangement of a security system 204 for providing access by a requester 200 to an encrypted data object 208 stored in an object store 202 in accordance with embodiments of the present disclosure.

The object store 202 is a hardware, software, firmware or combination component for storing encrypted data objects 208. Encrypted data objects are data objects encrypted by the security system 204 as described below. Each encrypted data object 208 (and the data object itself) has associated an object identifier (OID) that is unique within the context of the computing system or systems in which the encrypted data object is to be referenced, communicated, stored, accessed or passed. The OID can be a numeric value. Alternatively the OID is non-numeric and suitable for conversion to a unique (within the same context) numeric value. Data objects that are encrypted can include files, data structures, data entities, continuous or discontinuous areas of memory addressed together as a unit of data, software modules stored in a memory including libraries, functions, classes and instantiated classes (as software objects), databases, database columns, rows, records, fields and the like. In one embodiment data objects are stored in an object storage mechanism in which data objects are addressed and manipulated as discrete units of storage. For example, such mechanisms can provide an abstraction between an object interface (how data is perceived, addressed, referenced, accessed and manipulated by other entities such as software components) and how the object is structured and stored (how data is organized, data structures used, storage media, addressing, content and format etc.) Thus, a data object storage mechanism can provide an abstraction and generalization of modes of data storage, though it will be appreciated by those skilled in the art that the storage of data in any form, howsoever organized, can be considered the storage of one or more data objects.

The object store 202 further includes, or has associated, a first access control system 206 as a software, hardware, firmware or combination component for authenticating a requester 200 requesting access to an encrypted data object 208. The requester 200 can be a user or a computing resource or component such as a software, hardware or firmware component seeking access to the encrypted data object 208. The requester 200 has associated a requester ID (RID) 201 as an identifier unique within the context of one or more computer systems for identifying the requester 200. The RID can be a numeric value. Alternatively the RID is non-numeric and suitable for conversion to a unique (within the same context) numeric value. For example RID 201 can be a user identifier for the requester. The first access control system 206 can employ any suitably secure mechanism for authenticating the requester 200 as will be apparent to those skilled in the art. In one embodiment, the first access control system 206 employs a challenge/response authentication technique in which a challenge is communicated to the requester 200 and a response to the challenge is received from the requester 200 so that the access control system 206 can authenticate the requester 200 on the basis of the challenge response. The object store 202 thus includes a requester interface 212 as a programmatic, communications or hardware interface between the object store 202 and the requester 200 via which the requester 200 can request access to the encrypted object 208 and also via which the authentication process of the access control system 206 takes place.

The object store 202 also includes a security system interface 214 as a programmatic, communications or hardware interface between the object store 202 and the security system 204 for communication with the security system 204 as described below. The requester interface 212 and the security system interface 214 can be secure interfaces such that information communicated via the interfaces 212, 214 is encrypted or otherwise secured from inspection.

The security system 204 is a software, hardware, firmware or combination component operating in a trusted environment of a computer system to encrypt data objects for storage as encrypted data objects 208 in the object store 202. For example, the security system 204 is a trusted library, kernel module, privileged software component or other component executing with an operating system, kernel, basic input/output subsystem or firmware of a computer system. The trusted nature of the security system 204 is such that the operations, functions and facilities of the security system 204 are trusted, such as parts of an operating system of a computer system are generally trusted. Alternatively, the security system 204 can be a software component, module or service operating as a trusted component within a computer system. Such trust can be provided, ensured or assured by security or isolation services that substantially restrict access to the security system 204, including the provision of the security system 204 in one or more of: a protected area of memory of a computer system; a separate processor or processing space; a separate virtual machine; a protected process, task or thread of execution; and the like. In one embodiment, the secure nature of the security system 204 is provided by hardware facilities of a computer system such as hardware or firmware processor modes of operation, memory addressing, restricted bus, restricted memory areas and the like.

The security system 204 is arranged to provide security facilities for the storage of data objects in the object store 202. The security system 204 includes an access control system 220 (hereinafter the second access control system 220) as a software, hardware, firmware or combination component for authenticating a requester 200 requesting access to an encrypted object 208. The first 206 and second 220 access control systems of the object store 202 and security system 204 respectively serve the same function— that is to authenticate the requester 200—but they achieve this in different ways. Howsoever the first access control system 206 is implemented, the second access control system 220 is implemented differently. Thus, in this way, the combination of the two access control systems 206, 220 constitutes multiple authentications, which can, in some embodiments, be multi-factor authentication. For example, the first access control system 206 may require a password while the second 220 may require a biometric identifier. Other such suitable challenge/response techniques employable by either or both access control systems 206, 220 include, inter alia: knowledge factors of authentication including, inter alia, password, pass phrase, personal identification number, challenge response, pattern, a secret, and the like; certification by an authority by way of, for example a certificate; an ownership factor of authentication, such as a hardware token, software token and the like; and inherence factors of authentication such as biometrics including fingerprint, retinal pattern, DNA sequence, or signature, face, voice, unique bio-electric signals, or other biometric identifier and the like. In this way the combination of the first access control system 206 and the second access control system 220 require that the requester 200 authenticate twice using different authentication techniques and/or factors and with disparate systems (the object store 202 and the security system 204) so as to markedly reduce the potential for spoofing or exploiting any authentication weakness in either of the authentication systems.

The security system 204 further includes a key derivation system 224 as a hardware, software, firmware or combination component for generating keys for the encryption data objects and the decryption of encrypted data objects 208. The key derivation system 224 generates keys on a per-object, per-requester basis using a key derivation function KDF such that:

$$DK=KDF(OID,RID,secret)$$

where: DK is a derived key, for example a symmetric key; OID is a numeric identifier of a data object for encryption (or a numeric version of a non-numeric identifier); RID is an identifier of a requester (or a numeric version of a non-numeric identifier); and "secret" is a secret key portion generated by a secret key portion generator 222 of the security system 204. The secret key portion generator 222 is a software, hardware, firmware or combination component arranged to generate a portion of an input parameter for the key derivation function KDF. The secret key portion can be a substantially random (such as pseudo-random) number suitable for combining with the OID and RID to generate a secure key. In a preferred embodiment, the key derivation system 224 generates a key of 256 bits or longer.

The security system 204 further includes an encrypter/decrypter component 226 as a software, hardware, firmware or combination component adapted to encrypt a data object to an encrypted data object 208 and decrypt an encrypted data object 208 to a data object. In each encryption/decryption operation the encrypter/decrypter 226 uses a key generated by the key derivation system 224.

The security system 204 includes a requester interface 218 as a programmatic, communications or hardware interface between the security system 204 and the requester 200 via which the authentication process of the access control system 220 takes place and also via which an encrypted data object 208 can be communicated to the requester. The security system 204 also includes an object store interface 216 as a programmatic, communications or hardware interface between the object store 202 and the security system 204 for communication with the security system 204 as described in detail below. The requester interface 218 and the object store interface 216 can be secure interfaces such that information communicated via the interfaces 216, 218 is encrypted or otherwise secured from inspection.

Returning to the requester 200, the requester 200 has access to, or includes, a key derivation system 203 and a decrypter 205 substantially as hereinbefore described with reference to the security system 204. Using the key derivation system 203 and the decrypter 205 the requester 200 can generate a symmetric key to decrypt an encrypted data object 208. However, the elements required to generate an appropriate symmetric key for a data object are controlled by the object store 202 and the security system 204 as will be described below. In one embodiment, the key derivation system 203 and the decrypter 205 are provided as components of the object store 202, or a further function or component of an operating system or a computer system. For example, where the requester 200 is a user the key derivation system 203 and decrypter 205 can be provided by the object store 202 to generate a symmetric key and decrypt an encrypted data object 208 in accordance with methods of embodiments of the present disclosure described in detail below.

While the various components of the security system 204 have been illustrated and described as separate components it will be apparent to those skilled in the art that the components could alternatively be combined or further separated in any suitable alternative arrangement. Further, certain of the components of the security system 204 could be alternatively provided external to the security system 204 such as trusted components in other parts of an operating system or computer system, provided that such external components are trusted maintain the trusted status of the security system 204.

The object store 202 and the security system 204 are illustrated and described as separate components. Some aspects, functions or components of the security system 204 could alternatively be embodied within, as part of or in association with the object store, provided that such components are trusted to maintain the trusted status of the security system 204. However, the separation of the two access control systems 206, 220 in two disparate systems (the object store 202 and the security system 204) is required to ensure no one system can be undermined, attacked, violated, spoofed or exploited to undermine the multiple authentication approach in accordance with embodiments of the present disclosure.

The operation of the security system 204 and the object store 202 in the storage and retrieval of data objects will now be described with reference to the flowcharts of FIGS. 3, 4a and 4b.

Figure 3:
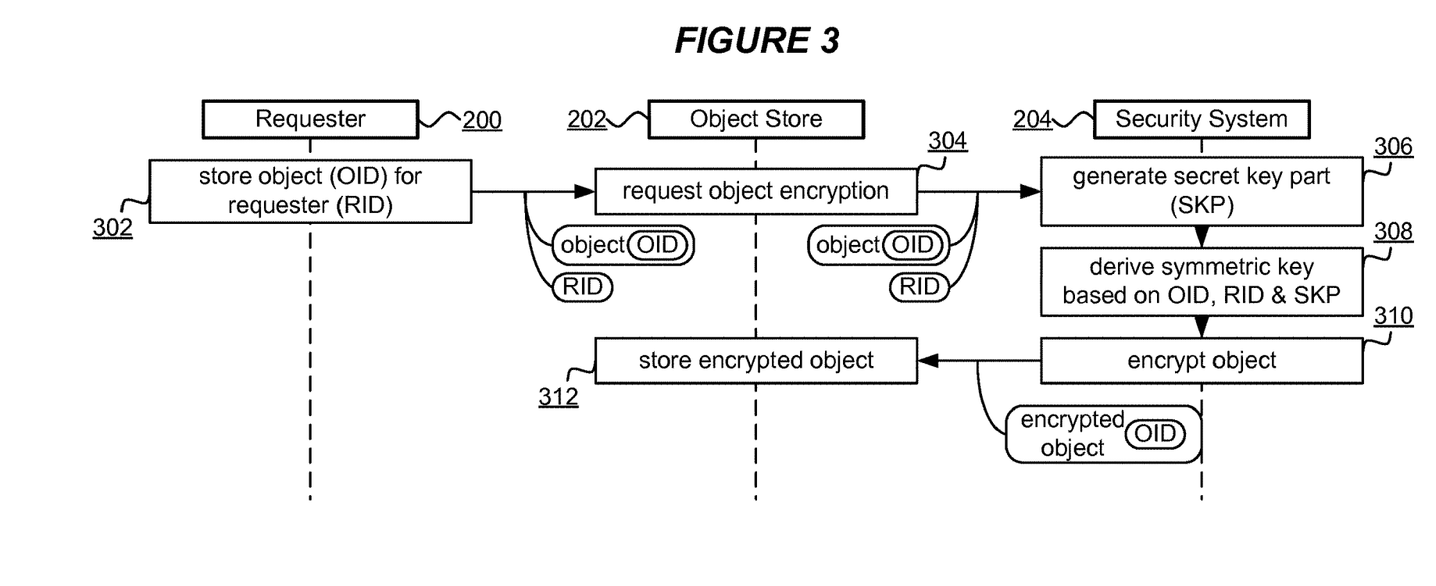
FIG. 3 is a flow diagram depicting an exemplary process for the secure storage of an object in an object store in accordance with embodiments of the present disclosure.

FIG. 3 is a flow diagram depicting an exemplary process for the secure storage of an object 208 in an object store 202 in accordance with embodiments of the present disclosure. Initially, at 302, a requester 200 sends a request to the object store 202 for the storage of a data object. The object is sent having associated its OID, and the RID of the requester is sent. At 304 the object store 202 requests encryption of the data object by the security system 204, sending the object, its OID and the RID of the requester via the object store interfaces 216, 214. The security system 204 initially generates a secret key part SKP at 306 and derives a symmetric key at 308. The symmetric key is generated based on the OID of the data object to be encrypted, the RID of the requesting user 200 and the secret key part SKP generated at 306. Notably, a new secret key part SKP is generated for each new object encryption request such that, in one embodiment, no two encrypted objects share the same secret key part SKP. The security system 204 subsequently encrypts the data object using the generated symmetric key at 310 and the encrypted object is communicated to the object store 202 via the object store interfaces 216, 214. At 312 the object store 202 stores the encrypted object 208. Optionally, the object store 202 can communicate a notification to the requester 200 that the object has been successfully stored.

Thus, in this way a data object is stored in an encrypted form by the object store 202. The object is encrypted by the security system 204 using a symmetric key generated on the basis of the RID for the requester, the OID for the data object and a secret key portion SKP. Notably, the secret key portion SKP used to encrypt the data object for storage in the object store 202 (hereinafter known as the first cryptographic key) is never communicated by the security system 204. Thus, the first cryptographic key remains a secure secret of the trusted security system 204. Consequently, once stored, the encrypted data object 208 cannot be decrypted by the object store 202 or the requester 200 since only the security system 204 has all the elements required to derive the key, specifically the secret key portion that is not available to other components. In one embodiment, the secret key part SKP is generated by the security system 204 for a specific combination of (OID, RID) such that each (OID, RID) combination has a secret key part SKP. Alternatively, the SKP can be RID specific or OID specific. In such embodiments, the security system 204 may store the secret key part securely in a trusted manner for subsequent retrieval when access to the encrypted data object 208 is requested. In alternative embodiments, the secret key part SKP can be generated anew for each new object storage request, in which case the first cryptographic key may be stored by the security system 204, in a secure and trusted manner, in association with the OID and RID for the encrypted object.

Figure 4A:
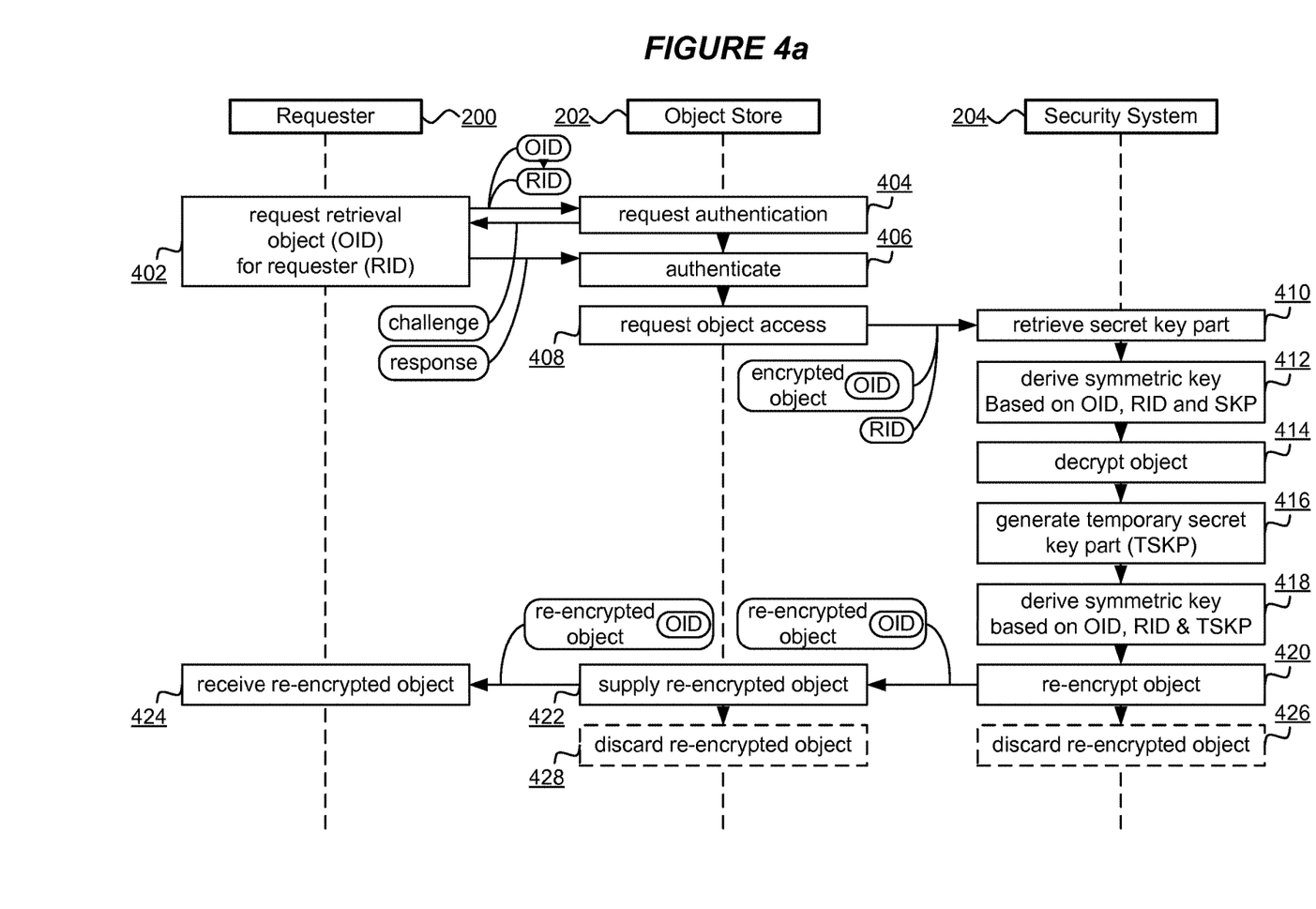
FIGS. 4a and 4b are flow diagrams depicting an exemplary process for providing access by a requester to an encrypted data object stored in an object store in accordance with embodiments of the present disclosure.
Figure 4B:
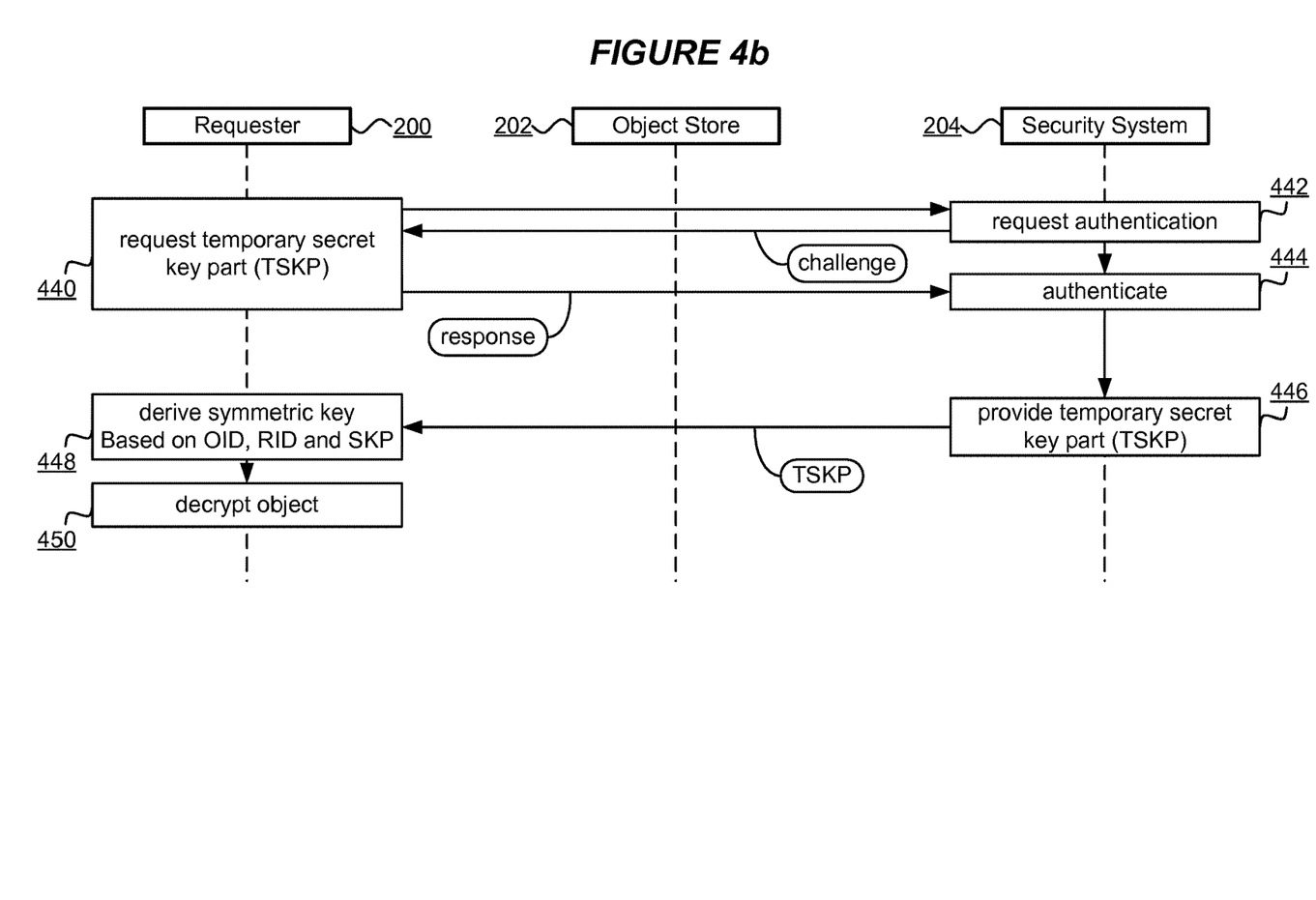

FIGS. 4a and 4b are flow diagrams depicting an exemplary process for providing access by a requester 200 to an encrypted data object stored in an object store 202 in accordance with embodiments of the present disclosure. Referring initially to FIG. 4a, at 402 the requester 200 sends a request to the object store 202 to retrieve a data object supplying an OID for the object and the requester's RID. At 404 the object store 202 initiates a first authentication process via the requester interface 212. If the object store 202 successfully authenticates the requester 200 at 406, the object store 202 retrieves an encrypted data object 208 identified by the OID supplied by the requester 200. At 408 the object store 202 sends a request to the security system 204 to access the encrypted object 208, sending the encrypted object with its associated OID and the RID of the requestor 200. At 410 the security system retrieves a secret key part SKP associated with the OID, RID or OID and RID (depending on the basis on which the security system generates and stores the secret key part SKP). At 412 the security system 204 derives the symmetric key based on the OID, RID and SKP. In an alternative embodiment where the security system 204 securely stores a symmetric key for an OID and RID, 410 to 412 can be replaced by a process of retrieving such securely stored symmetric key.

Subsequently, at 414 the security system 204 decrypts the encrypted data object 208 provided by the object store 202. Notably, the decrypted object is not sent to the object store or the requester but is retained securely in the secure and trusted security system 204. At 416 the security system generates a new secret key part as a temporary secret key part TSKP which is used, at 418, to derive a new symmetric key based on the OID, RID and TSKP. This new symmetric key is hereinafter known as the second cryptographic key. The security system then re-encrypts the data object at 420 using the second cryptographic key and sends the re-encrypted data object to the object store 202 for onward communication to the requester 200 at 422. Thus the requester receives the re-encrypted data object at 424.

Notably, the requester has access to the OID and the RID but does not have access to the temporary secret key part TSKP and so is not yet able to decrypt the re-encrypted data object.

As indicated in FIG. 4a in broken boxes, subsequent to re-encrypting the data object at 420 the security system 204 can discard the re-encrypted object at 426. The originally encrypted object (encrypted with the first cryptographic key) can continue to be stored in the object store 202 unless explicitly deleted, removed or discarded, and the security system 204 retains the means to access the encrypted object by way of the stored secret key portion for generation of the first cryptographic key (or, in some embodiments, the stored first cryptographic key itself). Further, the object store 202 also can discard the re-encrypted object at 428 for the same reasons.

Turning now to FIG. 4b, in order for the requester 200 to access the re-encrypted data object, the requester 200 must authenticate with the security system 204 in order to receive the temporary secret key part TSKP to generate the second cryptographic key. Such authentication may be prompted by the requester 200 itself or may follow from 420 at the instigation of the security system 204. In any event, the requester 200 requests the temporary secret key part TSKP either explicitly or implicitly at 440 and the security system 204 requests authentication of the requester at 442. If authentication is determined to be successful at 444, the security system communicates the temporary secret key part TSKP to the requester 200 at 446. The requester 200 receives the temporary secret key part and, using the key derivation system 203, derives the second cryptographic key based on the OID, RID and temporary secret key part TSKP at 448. Subsequently the requester 200 decrypts the data object at 450 using the second cryptographic key and the decrypter 205.

In embodiments where the key derivation system 203 and the decrypter 205 are provided by, for example, the object store 202, 448 and 450 may take place at the object store 202, though such embodiments may be less preferred since they lead to the transfer of the decrypted object to the requester 200. The security of such embodiments depends on the security of the requester interface 212 between the object store 202 and the requester 200, and on any communication medium such as network, inter-process communication, applications programming interface, bus, shared memory and the like between the object store 202 and the requester 200.

Thus embodiments of the present disclosure provide for a multiple authentication requirements for access to stored encrypted data objects in the object store 202. Each authentication takes place using a different approach to authentication which can include different authentication factors (multi-factor authentication), different credentials and the like. Further, each authentication takes place with a different system—a first authentication taking place with the object store 202 and a second authentication taking place with the security system 204. Further, embodiments of the present disclosure utilize multiple cryptographic keys, a first cryptographic key for the storage of a data object and a second cryptographic key for each retrieval of the object. Thus, when stored, only the security system 204 can derive the cryptographic key necessary for access to the object. Even the requester 200 itself does not possess the information required to access the encrypted object. Thus, compromise of any of the object store, the requester or the interfaces therebetween will not provide access to the encrypted data object. Further, data objects are encrypted and stored on a per-user basis such that individual users access encrypted objects based on their RID. Similarly, encryption of data takes place on a data object basis such that individual objects are encrypted based on their OID. Despite such associations between the users, objects and encryption methodology, user access control (such as Windows logon credentials) are not sufficient to access encrypted data objects stored in the object store 202. Accordingly, loss, disclosure, discovery, weakness or attack of user credentials does not compromise the security of encrypted data objects. The association between RID, OID and secret key parts for the storage of encrypted data objects is therefore extremely difficult to attack. This difficulty increases as the number of objects, users and secret key portions increases, as will be the case with federated multi-cloud environments. Additionally, the second cryptographic key (which is communicated outside the security system 204) is suitable only to decrypt the re-encrypted data object. The second cryptographic key cannot decrypt the encrypted data object stored in the object store 202. Thus there is a tight coupling between the second cryptographic key and the re-encrypted data object. Notably, the re-encrypted data object is communicated to the requester 200 via the object store 202, whereas the second cryptographic key may be communicated to the requester 200 directly by the security system 204. Thus the paths for communication of the re-encrypted data object and the corresponding cryptographic key are different, introducing further precaution against intrusion, attack, snooping and the like. The security of embodiments of the present disclosure can be further improved by further separating the paths used by the second key and the re-encrypted object, such as by using separate paths employing disparate encrypted communications methods or by introducing a further path between the security system 204 and the requester 200 such that the re-encrypted data is communicate by a different mode. Yet further, embodiments of the present disclosure are operable using only symmetric keys, such symmetric keys providing improved encryption performance for encrypting data over, for example, asymmetric key pairs, and such symmetric keys removing any need for any component securely store any keys except the security system 204 (save for the need for the requester 200 to keep secure the second cryptographic key in association with the re-encrypted data object).

Figure 5:
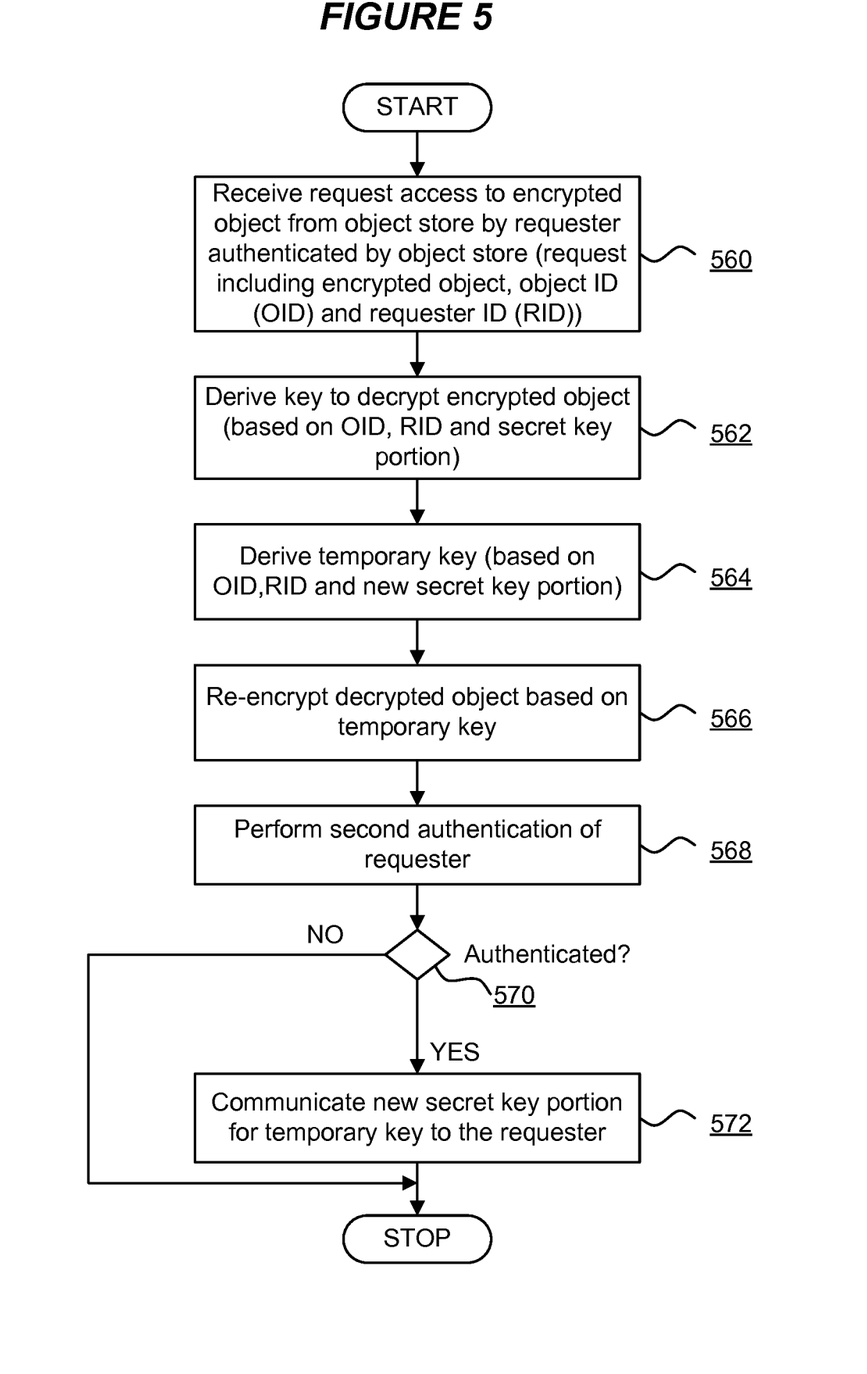
FIG. 5 is a flowchart of an exemplary method of the security system of FIG. 1 in accordance with embodiments of the present disclosure.

FIG. 5 is a flowchart of an exemplary method of the security system 204 of FIG. 1 in accordance with embodiments of the present disclosure. Initially, at 560, the security system 204 receives a request for access to an encrypted data object by a requester 200. The requester is authenticated by the object store 202 and the request includes the encrypted object, the OID and the RID of the requester 200. At 562 the security system derives the first cryptographic key to decrypt the encrypted object. The first cryptographic key is derived based on the OID, RID and a secret key portion previously generated by the security system 204 to encrypt the data object. At 564 the security system 204 derives a temporary key (second cryptographic key) based on a temporary (new) secret key portion. At 566 the security system 204 re-encrypts the data object based on the temporary (second cryptographic) key. The re-encrypted data object is then communicated to the requester 200, such as via the object store 202. At 568 the security system performs a second authentication of the requester, different in manner, form, mode, function or technique to an authentication conducted by the object store 202. At 570 if the authentication is successful, the method proceeds to 572 where the temporary (new) secret key portion is communicated to the requester 200.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of a security system to provide access by a requester to an encrypted data object stored in an object store, the requester being authenticated by the object store using at least a first factor of authentication, the method comprising:
   receiving, from the object store, the encrypted data object having associated an object identifier, and an identifier of the requester;
   deriving a first cryptographic key to decrypt the encrypted data object into a decrypted object;
   deriving a second cryptographic key;
   re-encrypting the decrypted object based on the second cryptographic key into a re-encrypted object and communicating the re-encrypted object to the requester;
   wherein each of the first cryptographic key and the second cryptographic key are symmetric cryptographic keys that are based on the object identifier, the requester identifier, and a secret key portion generated by the security system, the secret key portion being different for each of the first cryptographic key and the second cryptographic key, the method further comprising:
   in response to a second authentication of the requester by the security system using at least a second factor of authentication different from the first factor of authentication, communicating the secret key portion for the second cryptographic key to the requester; and
   wherein the authentication by the object store and the second authentication are undertaken using different authentication techniques.

2. The method of claim 1 wherein the encrypted data object results from an encryption of a data object by the security system using the first cryptographic key, the encrypted data object being stored in the object store.

3. The method of claim 2 wherein access to the secret key portion for the first cryptographic key is restricted to the security system.

4. A security system to provide access by a requester to an encrypted data object stored in an object store, the requester being authenticated by the object store using at least a first factor of authentication, the system comprising:
   a central processor unit;
   a first interface to communicate with the object store to receive the encrypted data object having associated an object identifier, and an identifier of the requester;
   a key derivation system to generate, using the central processor unit, a first cryptographic key and a second cryptographic key, the first cryptographic key being used by a decrypter to decrypt the encrypted data object into a decrypted object;
   wherein the first cryptographic key and the second cryptographic key are symmetric cryptographic keys;
   an encrypter to re-encrypt the decrypted object into a re-encrypted object based on the second cryptographic key;
   a second interface to communicate with the requester;
   wherein each of the first cryptographic key and the second cryptographic key are based on the object identifier, the requester identifier, and a secret key portion generated by the security system, the secret key portion being different for each of the first cryptographic key and the second cryptographic key;
   wherein the re-encrypted object is provided to the object store via the first interface for access by the requester;
   wherein the system further comprises:
   an access control system including a challenge generator to further authenticate the requester based on a response to a challenge received via the second interface, the response to the challenge being different from the first factor of authentication;
   wherein the authentication by the object store and the access control system are undertaken using different authentication techniques; and
   wherein the second interface is further responsive to the access control system to communicate the secret key portion for the second cryptographic key to the requester.

5. The system of claim 4 wherein the encrypted data object results from an encryption of a data object by the security system using the first cryptographic key, the encrypted data object being stored in the object store.

6. The system of claim 4 wherein access to the secret key portion for the first cryptographic key is restricted to the security system.

7. A non-transitory computer-readable storage medium storing a computer program element comprising computer program code which, when loaded into a computer system and executed thereon, causes the computer system to perform a method comprising:
   providing access by a requester to an encrypted data object stored in an object store, the requester being authenticated by the object store using at least a first factor of authentication by:
   receiving, from the object store, by a security system, the encrypted data object having associated an object identifier, and an identifier of the requester,
   deriving a first cryptographic key to decrypt the encrypted data object into a decrypted object,
   deriving a second cryptographic key, each of the first cryptographic key and the second cryptographic key being based on the object identifier, the requester identifier, and a secret key portion generated by the security system, the secret key portion being different for each of the first cryptographic key and the second cryptographic key,
   wherein the first cryptographic key and the second cryptographic key are symmetric cryptographic keys;
   re-encrypting the decrypted object based on the second cryptographic key into a re-encrypted object and communicating the re-encrypted object to the requester, and
   in response to a second authentication of the requester by the security system using at least a second factor of authentication different from the first factor of authentication, communicating the secret key portion for the second cryptographic key to the requester;

wherein the authentication by the object store and the second authentication are undertaken using different authentication techniques.

* * * * *